Figure 1:
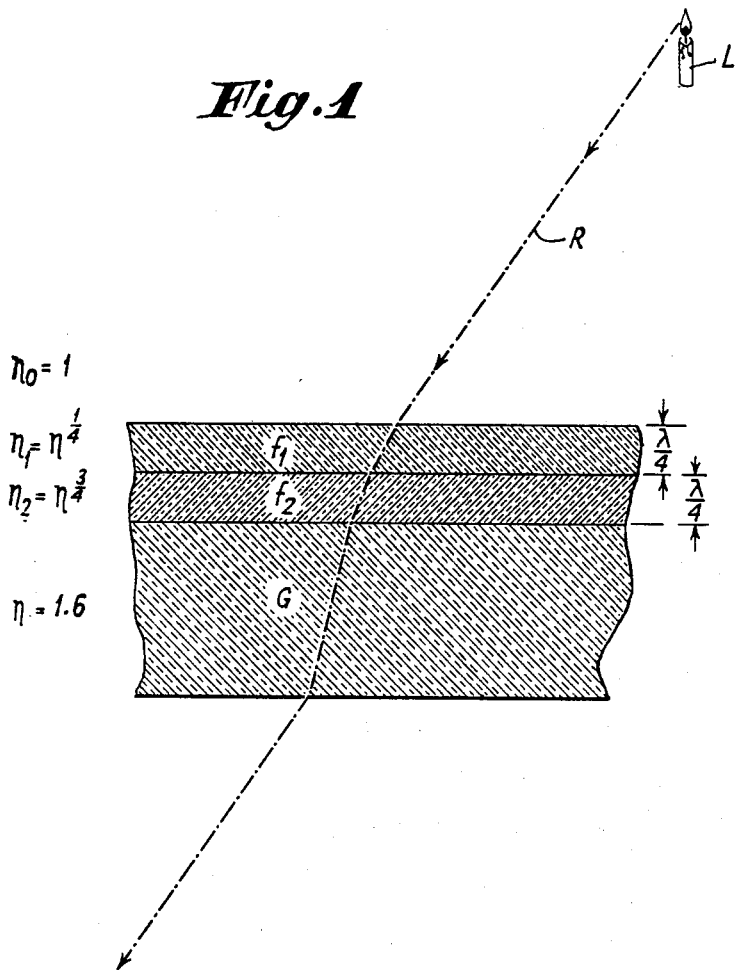

May 22, 1945.  C. W. HANSELL  2,376,428
METHOD OF AND MEANS FOR PREVENTING LIGHT REFLECTION
Filed April 13, 1940  2 Sheets-Sheet 1

INVENTOR
C.W. HANSELL
BY
ATTORNEY

May 22, 1945.    C. W. HANSELL    2,376,428
METHOD OF AND MEANS FOR PREVENTING LIGHT REFLECTION
Filed April 13, 1940    2 Sheets-Sheet 2
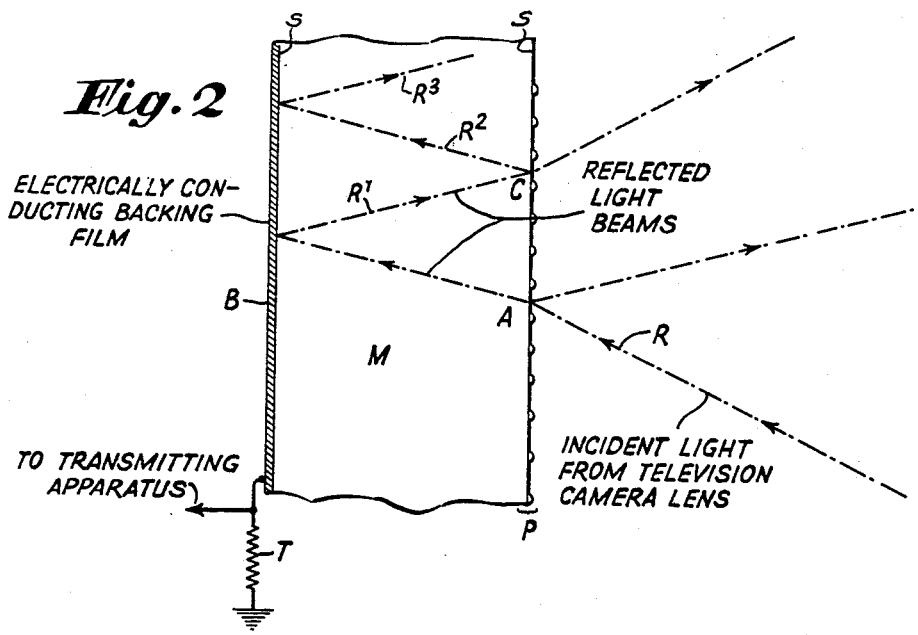
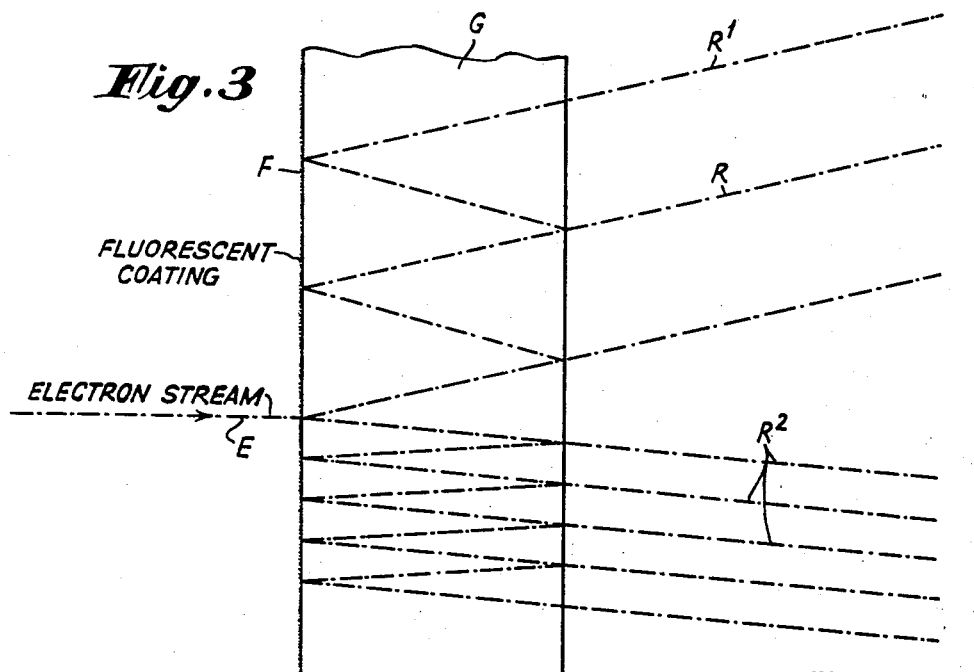
INVENTOR
C. W. HANSELL
BY
ATTORNEY Patented May 22, 1945

2,376,428

UNITED STATES PATENT OFFICE 2,376,428

METHOD OF AND MEANS FOR PREVENTING LIGHT REFLECTION

Clarence W. Hansell, Rocky Point, N. Y., assignor to Radio Corporation of America, a corporation of Delaware Application April 13, 1940, Serial No. 329,471

5 Claims. (Cl. 88—1)

The present invention relates to a means for avoiding reflection of light at a junction between a transparent medium having a certain refractive index and another transparent medium having a different refractive index.

More particularly, the present invention relates to a means for stopping reflection of light from the surface of transparent material over a wide range of light color.

For stopping light reflection by means of a quarter wave film the film should have a refractive index which is the geometric mean of the refractive indices of the two media through which the light travels. If a transparent material, such as glass, is assumed to have a refractive index of 1.6 and it is in air or vacuum having a refractive index of 1 then the quarter wave thick layer should have a refractive index of $\sqrt{1 \times 1.6} = 1.265$.

An object, therefore, of the present invention is to avoid reflection of light at a junction between a transparent medium having one refractive index and another transparent medium having a different refractive index.

Another object of the present invention is to provide means for matching the refractive index of one transparent medium with respect to another adjacent medium with reduced wavelength discrimination.

Still another object of the present invention is the prevention of halation in iconoscopes, kinescopes and photographic films and plates.

Still a further object of the present invention is the prevention of reflection over a broad range of color in optical devices including lenses, iconoscopes, kinescopes and other such devices where light passes through media of different refractive indices.

My invention involves the use of an even number of superimposed quarter wave films between one transparent medium and the other, the ratio of refractive indices of said films bearing such a relationship to the refractive index of the final transparent medium that low reflection takes place over a wide range of light colors. White light will therefore be transmitted substantially without loss except for the absorption of the transparent media, which is usually quite small.

According to the simplest form of my invention, if light waves are to be passed, with little reflection for any color, through the boundary between transparent media having refractive indices of $\eta_0$ and $\eta$, then there should be interposed at the boundary two layers each about a quarter wave thick for the mean light frequency or color. The first of these layers should have a refractive index of $$\eta_1 = \left(\frac{\eta}{\eta_0}\right)^{\frac{1}{4}}$$

and the second should have a refractive index of $$\eta_2 = \left(\frac{\eta}{\eta_0}\right)^{\frac{3}{4}}$$

By this means the wave impedance transformation in going from one medium to the other is performed in two equal ratio steps.

In stopping light reflection by means of thin layers improved results may be had by employing 2, 4, 6, 8 or more layers of successively different refractive index so that the wave impedance transformation is performed in more than one pair of steps. However, since the range of visible light frequencies is only about 1.6 to 1, or plus and minus 26% from the mean, and the required impedance transformation ratio is usually not very great, two layers will generally be found to give results which may be considered to be substantially perfect.

By performing the wave impedance transformations in one or more pairs of equal ratio steps, reflections of waves at boundaries between media of different refractive index may be kept small over a large range of frequencies and wavelengths. This makes possible a very considerable improvement in the color characteristics of many devices employing light, including cameras, telescopes, microscopes, iconoscopes, kinescopes, window glass, etc., in that reflections at surfaces are kept small over a wider range of light wave lengths.

A more complete understanding of the present invention may be had by reference to the following detailed description which is accompanied by drawings showing, diagrammatically, in Figure 1, one way of carrying my invention into practice, while Figure 2 shows the application of the invention to iconoscope screens and Figure 3, to kinescope screens.

Figure 1 shows a sheet of glass G through which it is desired to pass a ray of light R without reflection from at least one boundary surface. The upper surface is treated in the example shown and is the surface nearest the source of light L and, in accordance with my invention, has interposed between the surface of the glass and the adjacent air or vacuum a pair of films $f_1$ and $f_2$ of quarter wave thickness for matching the refractive index of the glass to the refractive index of the air or vacuum adjacent the glass. It is to be understood that when I refer to a quarter wave thickness of the matching films, the wavelength is considered to be the mean wavelength of visible light band, or the mean wavelength of the band considered important. If reflection at the lower surface of glass G is also troublesome it may be treated in the same way as the upper surface. The refractive index $\eta$ of the glass in the example shown is taken as 1.6.

In order to prevent reflection at the surface of the glass the first of the two matching films $f_1$ has a refractive index of $\eta_1 = (1.6)^{\frac{1}{4}} = 1.125$, while the second matching film $f_2$ has a refractive index of $\eta_2 = (1.6)^{\frac{3}{4}} = 1.423$.

Any of the heretofore known processes for applying single quarter wave layers to transparent media for the purpose of reducing reflections may be utilized in the present invention for the application of double layers having the desired ratio of refractive indices. Since, as far as I am aware, nature has provided relatively few materials of required low refractive indices for carrying out the invention, it appears necessary at present to resort to layers of submicroscopically skeletonized materials of higher refractive indices prepared, as above described, in order to obtain required low effective refractive indices.

In working with single quarter wave films, Katherine Blodgett of the General Electric Company Research Laboratory, has made films of suitable refractive index by applying coatings of mixed barium stearate and stearic acid and then dissolving out the stearic acid to leave a skeletonized film of barium stearate. To carry out my present invention, two films may be applied using different ratios of the two materials such that, after the stearic acid is dissolved from both films, each will have the desired resultant refractive index.

Undoubtedly, many other materials of this nature may be employed.

To illustrate one of many possible applications of the invention, reference may be made to Figure 2 which shows a greatly enlarged approximate cross section of a portion of an iconoscope used to turn light images into electrical impulses for television transmission. In the figure I have shown a cross section of a thin mica sheet M bearing a photo-emissive coating P on one side and an electrically conducting coating B on the other. In practice, the photo-emissive coating may be made up of a translucent layer of separated spots or globules of silver deposited by evaporation in a vacuum, slightly oxidized and then coated by evaporation with caesium. When an optical image to be televised is cast upon the coating P, as indicated by ray R, the coating assumes electrical charges distributed over its area in accordance with the distribution of light in the optical image. An electron beam (not indicated) having a small cross section is passed over the coating in a regular pattern during the scanning process to successively discharge the charges built up on elemental areas by the incident light forming the optical image.

In discharging the elemental areas by scanning with the electron beam a variable electron current from the beam is caught upon the surface and, by induction, causes a variable electrical current to flow in a circuit T connected to the electrically conducting coating B on the back side of the mica sheet M.

Since the photo-emissive coating P is translucent and both coatings P and B are light reflectors to a considerable degree, light entering the mica sheet M, as at point A, is successively reflected though with diminishing strength with each reflection. This is indicated by $R^1$, $R^2$ and $R^3$. Reflected light falling upon the translucent photoemissive coating, from the back side, for example at point C, also causes electrical charges to appear upon the coating but these charges are not properly located with respect to the original impinging light and the primary charge image. As a consequence, the multiple reflections tend to blur the charge image and detract from the detail and sharpness of definition of the transmitted images. A similar action of light in the support for a photographic film is called halation.

In practice, the first reflection from the backing film or coating may be tolerated because the first reflected rays arriving back at the photoemissive coating are not greatly displaced from the initial incident rays and because they add to the total photosensitivity of the iconoscope. However, the additional reflections are likely to be very objectionable.

If, in accordance with the present invention, the mica sheet is first covered on the side from which the incident light comes with the double layers of material of intermediate refractive indices between those of mica and vacuum as previously described with reference to Figure 1, before the translucent silver, silver oxide and caesium layer is applied, then successive reflections in the mica may be very greatly reduced and the blurring of the electrical images will be reduced. As a consequence, television may be made more clear and sharp. Likewise, in the preparation of photographic plates, if a pair of matching films are coated on the plate before the sensitive emulsion is applied blurring of the photographic image, due to halation, will be avoided. In this case, the films should be applied to both surfaces of the plate and will be found far superior to the usual non-halation coating.

In television receivers of the most common kind the received images are produced by scanning the surface of a fluorescent coating with an electron stream which is modulated in strength to vary the light produced at the point of impact of the stream on the coating. The fluorescent coating is in vacuum on the inside surface of a glass wall forming one end of the reproducing device or kinescope.

Figure 3 represents, in cross section, a small portion of the end of the kinescope on which the received images are formed. It will be evident that light produced in the fluorescent coating P, due to the action of the electron stream E, must pass through the glass wall G to reach the eye of the observer, as indicated by ray R. Reflections will take place at the wall surfaces producing subsidiary images as indicated by rays $R^1$ and $R^2$. These reflections tend to spread out and diffuse the light and to blur the images. Here, again, the application of the double layers of graduated refractive index, as shown in Figure 1 on either or both surfaces, may be utilized to prevent reflections and so to reduce the blurring.

In both the iconoscope of Figure 2 and the kinescope of Figure 3, the use of one or more pairs of layers of successive refractive index, instead of a single layer, has the virtue of keeping reflections low over a broader band of frequencies or wavelengths.

Obviously, the double layers of the invention may be applied in any other application where it is desired to reduce reflections of electromagnetic waves of any range of wavelength or frequency. They may be applied to mirrors, lenses, microscopes, telescopes, windows, radiators and absorbers of heat radiations, walls for passing radio waves, etc. In all these applications the use of two layers, or multiples of two layers, permits low reflections over broader bands of wavelength.

For extremely broad wavelength bands a large number of layers of successively different refractive index may be employed which, as an ultimate limit, approaches a gradually tapering refractive index from the index of one medium to that of another. In all cases where the taper in refractive index with respect to distance is made gradual enough reflections may be minimized over any desired wavelength range.

While I have particularly described and shown several embodiments of my invention, it is to be clearly understood that my invention is not to be limited to these embodiments but that modifications within the scope of the invention may be made.

I claim:

1. Means for reducing reflections of electromagnetic waves passing between a material with a refractive index of $\eta_0$ and a material of a refractive index of $\eta$ constituting two layers of material inserted between said materials each being substantially a quarter wave thick for some of the waves, the layer next to the material with refractive index of $\eta_0$ having a refractive index of $$\eta_1 = \left(\frac{\eta}{\eta_0}\right)^{1/4}$$

and the other layer having a refractive index of $$\eta_2 = \left(\frac{\eta}{\eta_0}\right)^{3/4}$$

2. In combination, a pair of adjacent transparent media, the refractive index of the second of said media being $\eta$ times the refractive index of the first, an even number $n$ of matching films interposed between said media, each of said films having a thickness equal to one-quarter of the mean wavelength of light and having refractive indices of $\eta_1$, $\eta_2$, $\eta_n$, the refractive index of the first of said films being $$\eta_1 = \eta^{\frac{(1)}{2n}}$$

that of the second films being $$\eta_2 = \eta^{\frac{(3)}{2n}}$$

and that of the $n$th film being $$\eta_n = \eta^{\frac{(n-1)}{2n}}$$

3. In combination, a pair of adjacent transparent media, the refractive index of the second of said media being $\eta$ times the refractive index of the first of said media, a pair of matching films interposed between said media, each of said films having a thickness equal to one-quarter of the mean wavelength of light, the refractive index $\eta_1$ of the first of said films being $\eta^{\frac{1}{4}}$ and the refractive index of the second film $\eta_2$ being $\eta^{\frac{3}{4}}$.

4. The method of treating the surface of a glass body to reduce light reflection at a surface which comprise superimposing on said glass surface a pair of quarter wave transparent films, the refractive index of the outer of said films being equal to the one-quarter power of the refractive index of the glass and the refractive index of the inner of said films being equal to the three-quarter power of the refractive index of the glass.

5. An article of manufacture, including a first layer of a substance having an index of refraction $\eta$, a second layer of substance in contact with said first layer and adapted to pass said waves, said second layer having a refractive index equal to $\eta^{\frac{1}{4}}$ and a third layer of substance in contact with said second layer and adapted to pass said waves, said third layer having a refractive index equal to $\eta^{\frac{3}{4}}$, said second and third layers being a quarter wavelength thick at the middle of said band of wavelengths.

CLARENCE W. HANSELL.